Figures 1, 2:
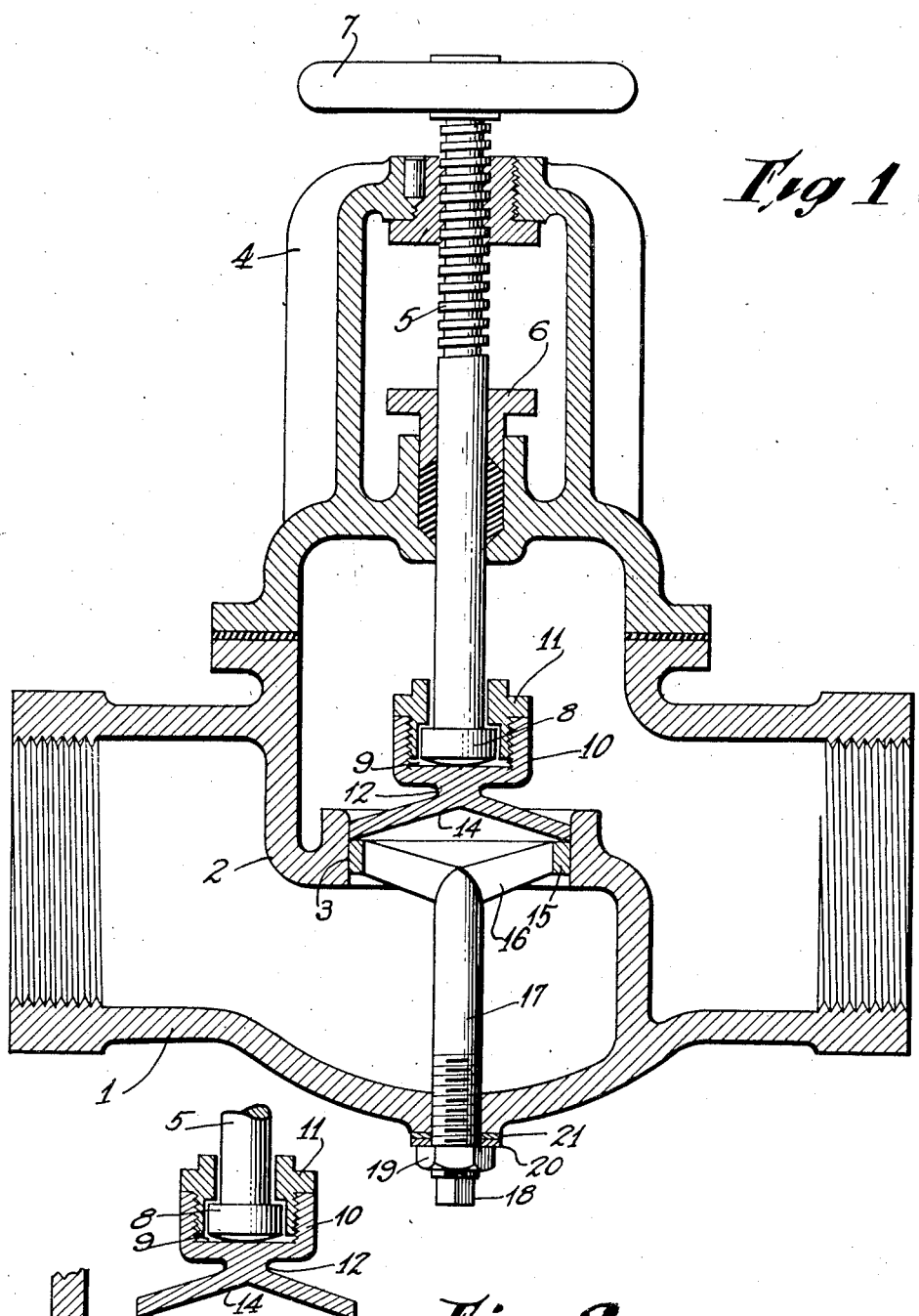

Dec. 27, 1927.

W. G. WILSON

VALVE

Filed Jan. 25, 1926

1,654,516

INVENTOR.
Wylie G. Wilson
BY James L. Stewart
ATTORNEYS.

Patented Dec. 27, 1927.

1,654,516

UNITED STATES PATENT OFFICE.

WYLIE G. WILSON, OF JERSEY CITY, NEW JERSEY.

VALVE.

Application filed January 25, 1926. Serial No. 83,419.

This invention is a valve.

In the valve art, it is of fundamental importance that the seal effected by the valve be a tight seal and that the valve be capable of functioning a great number of times without becoming leaky, i. e., it should be repetitive in character, while retaining its capacity to produce a tight seal.

Pursuant to the practices of the prior art, valve seals have been formed by bringing a rigid sealing element into engagement with a rigid seat, or by forming one of these elements of material which is permanently deformed or distorted in producing the seal, or by interposing a gasket, composed of permanently deformable material, intermediate the sealing element and its seat. In the first instance, difficulties are encountered in accomplishing a tight seal because of irregularities in the two surfaces incident to their construction, to wear, to the presence of foreign matter between them, or to other causes. In the second and third instances, the deformable bodies very soon become so permanently distorted, as a result of wear, physical deterioration or other cause, that they can no longer produce a tight seal. In all the prior art structures, frequent inspection and repairs, at very considerable annoyance and expense, are necessary in order to maintain tight valves.

With these considerations in mind, the primary object of the present invention is to provide a valve capable of effecting a tight seal throughout long periods of repetitive use and under operating conditions, whereunder the valves of the prior art become ineffective after a relatively short period.

Another object of the invention is to so constitute the sealing element or elements and so operate them, that they may be constructed economically and without that refined workmanship which is usually incident to the grinding of valves and valve seats so they will cooperate perfectly. The present structures are such that, even though in their primary manufacture they may not be axially coincident with relation to each other or of truly complementary shape, yet in the operation of the valve, they will adjust themselves to such irregularities and compensate for the same by reason of the material from which they are manufactured and the particular form employed in this connection.

Speaking generally, this invention consists in a valve embodying a sealing element in the form of a hollow cone adapted to be stressed into tight sealing engagement with a substantially cylindrical seat when the element is subjected to axial pressure while in engagement with an adjustable stop.

I have discovered that a hollow conical sealing element will function with remarkable efficiency in the formation of a tight seal, when such sealing element is constructed from materials which, for the purpose of this invention, are termed "obdurate materials". By this term is meant materials which are bendable, but not easily bent, compressible, but not easily compressed, elastic, but not easily deformed. As examples of obdurate materials, I may mention, without excluding others, iron, steel, hard alloys (such as bronze), glass, ceramic materials, hard rubber, and wood. These materials are in pronounced contradistinction to those, which may be termed "non-obdurate", such as leather, asbestos, soft rubber, soft metals, etc.

The obdurate materials, when employed pursuant to this invention, are operated within their elastic limit, by which I mean that, when embodied in the form of a sealing element and placed under stresses which tend to deform said element, incident to producing a seal, the element shall retain a positive tendency to resume its original form when the stresses are relieved.

I have discovered that when an unbroken hollow cone of obdurate material is compressed axially, its outer periphery expands, substantially, in a circle; that is, the expansion is uniform all around when meeting with uniform resistance all around, and, accordingly, its periphery may be utilized to form a fluid tight seal with a suitable seat.

"Unbroken," as used above, may be defined as peripherally continuous; i. e., not slotted or formed into fingers.

By a "hollow cone", I mean a cone which is hollowed out to provide a conical shell.

By "axial compression", I mean pressure exerted upon the sealing element in a direction coaxial with or parallel to its axis, whereby its altitude is diminished and the peripheral diameter of its base increased.

Attention is particularly directed to the fact that the stressing of the sealing element or elements must be within the elastic limit thereof; otherwise, said element would not tend to resume (i. e., tend to spring back to) its normal unsealing form. Only an element in the sense of this invention composed of obdurate material and of substantially hollow conical configuration will thus properly function.

The term "elastic limit" as employed in the specification and claims of this application is so employed to designate that quality or characteristic of the conical forms of obdurate material employed which, when compressed within predetermined limits and then relieved of such compression, will cause said conical form to tend to return to approximately its orignal form and size. It is intended that such compression shall be within and not beyond the tendency of said conical section to return to its original form and size. That is to say, it is intended that the degree of axial pressure employed shall not be sufficient to break down and destroy the resilient or reactive quality of the conical form herein described. On the contrary, it is the purpose in practicing this invention that the degree of compression employed shall be limited to a degree where such reactive characteristic of said conical form will not be seriously affected.

For a better understanding of the operation of the sealing element of hollow conical form of this invention, it is suggested that it function like a toggle. This analogy is, of course, not absolute, but when considered in that light, it may be helpful to a clearer conception of the operation of the invention. When force is applied to the elbow of a toggle, a greater force is exerted at the ends of the toggle links, and this force increases in proportion as the axial dimension of the toggle, relative to the distance between the ends of the links, becomes less and less.

The sealing element of the present invention may be considered as functioning like a multiplicity of toggles; that is to say, there is a toggle-like action in each diametric plane, and, obviously, there is an infinite number of toggles. When the sealing element is compressed axially, the dimensions of such element and the proportioning of the obdurate material of which it is composed, bring about, within the element, the steadily increasing functional characteristics incidental to toggle action. This action results in a cross axial or radial movement of the sealing element until its periphery or peripheries are forced into tight sealing engagement with cooperating seats. The obdurate element is so dimensioned and proportioned that the seal is effected, in the manner described, before the elastic limit of the element is reached. Accordingly, upon release of the stresses incident to producing the seal, the element tends to autogenously, i. e., automatically, break the seal.

It therefore follows that in a value embodying this invention, the seal is effected by stressing a sealing element of obdurate material within its elastic limit and that the seal is maintained as long as the element is thus stressed. However, when these stresses are relieved the seal is broken.

Particular attention is called to the fact that the seat with which the hollow conical sealing element cooperates, is cylindrical whereby said element can be moved into the desired position within said seat and thereupon stressed into sealing engagement therewith. The exact position of such engagement is controlled by a stop or abutment which extends into the seat port and is adjustable longitudinally thereof, so that if one portion of the seat becomes worn, said stop can be moved to another position to bring about engagement between the sealing element and the seat at an unworn portion of the latter. This feature is of marked practical importance, since, by its incorporation, the life of the valve is materially prolonged. The valve of this invention is repetitive in that it can be operated a great number of times without serious distortion of the parts. This is due to the employment of the hollow conical sealing element of obdurate material and use of a cylindrical seat with a cooperating stop adjustable to compensate for wear. Through the incorporation of these structural features in valve construction, a highly meritorious valve is obtained.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a section through a valve embodying the present invention showing the valve in sealing position; and, Figure 2 is a fragmentary section similar to Figure 1, but showing the valve in open position.

Referring to the drawings, 1 designates a valve casing provided interiorly with a partition or diaphragm 2 in which is formed a cylindrical port opening, the wall 3 of which constitutes the valve seat. The casing is surmounted by a suitable bonnet 4, through which is threaded a valve stem 5 and the valve stem operates through a gland 6 which precludes leakage.

Affixed to the outer end of the valve stem is suitable operating means such as a hand wheel 7 and the inner end of the valve stem carries a knob 8 which is received within a pocket 9 formed in the valve spindle 10. A retaining nut 11 threads into the pocket 9 and serves to retain the head 8 within the pocket thereby mounting the spindle 10 upon the valve stem. Supported on the spindle 10 by an intermediate neck 12 of reduced cross section is the sealing element 14, which, as stated, is of hollow conical configuration, and the valve stem is coaxial with the seat 3, so that through the operations of said stem, the sealing element may be moved into and out of the port. Figure 1 shows the sealing element within and in cooperative relation with the port, whereas Figure 2 shows the sealing element raised out of the port to permit the unobstructed passage of fluid through the valve.

Positioned within the port and having a fair sliding fit with the valve seat is a stop ring or annulus 15 having therein a spider 16 carrying a depending shank 17. The shank is coaxial with the valve seat and valve stem and is threaded through the bottom of the casing. At its exterior end, it is polygonal, as shown at 18, to receive a wrench, whereby rotation may be imparted to the shank 17 for the purpose of raising or lowering the ring 15. The parts may be locked in the adjusting position desired by means of a jamb nut 19 acting against a washer 20 and a gasket 21.

The stop ring 15 is positioned within the port opening below the sealing element and the upper edge of said ring constitutes an abutment which serves as a stop to the downward movement of the sealing element when the latter is lowered into the port from the position of Figure 2. This abutment is capable of withstanding the maximum thrust to the valve stem to which it is apt to be subjected and serves to preclude downward movement of the sealing element after said element has been seated on the ring and is subjected to axial pressure of the valve stem necessary to effect tight sealing relation between the periphery of the sealing element and the seat 3.

As hereinbefore stated, the sealing element is of obdurate material, so that when force is applied through the valve stem, while the sealing element is seated on the stop ring 15, this force will place the sealing element under sufficient axial compression to expand the outer periphery of the sealing element into tight sealing engagement with the cylindrical seat 3. When in normal unsealing condition, the sealing element will move loosely into the port, but as soon as it is engaged with the stop ring and pressure applied by the valve stem, the altitude of said sealing element is diminished and its diameter sufficiently increased to effect the tight seal referred to. The stresses under which the sealing element are placed in the production of a seal continue as long as the sealing engagement is maintained, but it is a characteristic of the sealing element of this invention, that, as soon as pressure of the valve stem is relieved, the stresses within the sealing element are simultaneously relieved, whereupon the sealing element will automatically or autogenously tend to spring back to its unsealing condition, thereby breaking the seal and permitting the sealing element to be readily returned to the position of Figure 2 without binding.

It is of common knowledge that valve seats become worn at the zone of engagement of a sealing element after continued use of the valve and it is to compensate for this wear that the adjustable stop ring is made adustable. Thus, in practice, if the valve seat becomes worn above the upper edge of the stop ring 15, i. e., in the zone where the sealing element cooperates with said seat, the jamb nut 19 may be loosened and the stop ring may be lowered to expose an unused or an unworn portion of the seat for cooperation with the sealing element and this practice may be repeated from time to time as occasion may require until the entire length of the seat has become worn. This feature of the invention is of marked practical importance, since it obviates the necessity of frequent repairs and materially prolongs the life of the valve. A marked advantage which will be apparent in this connection is that the adjustments referred to may be made without dismantling any portion of the valve or causing a tie-up of the system in which the valve may be included.

The valve of the present invention is simple in construction although fully dependable in use. The edge contact made between the sealing element and the valve seat in the formation of the seal produces, in practice, an absolutely tight joint even though either or both the seat or sealing element are slightly out of round. Moreover, use has demonstrated that grinding or lapping of either the periphery of the sealing element or the seat is not necessary to a tight seal.

In the preferred embodiment of the invention, a sealing element of straight sided form is found to give the best practical results. I am aware, however, that some of the advantages of the invention may be obtained through the employment of forms, such as hollow spherical or elliptical sections. In practice, they are not so desirable as a straight sided form, but, for the reasons stated, the invention is not restricted to the precise configuration illustrated in this connection.

The foregoing detailed description sets forth the invention in its preferred practical form, but it will be understood that the invention is fully commensurate with the appended claims.

Having thus fully described the invention, what I claim as new and desire to secure by Letters Patent, is:

1. In a valve, a cylindrical seat, stop means adjustable longitudinally of the seat, a hollow, conical sealing element of obdurate material, and means for moving the sealing element into engagement with the stop and thereafter axially compressing said element to expand its periphery into tight sealing engagement with the seat.

2. In a valve, a cylindrical seat, stop means adjustable longitudinally of the seat, a hollow conical sealing element of obdurate material and of normally less diameter than the diameter of the seat, means for moving the sealing element into cooperative relation with the seat and into engagement with stop means, and thereafter compressing said sealing element axially to peripherally expand it into tight sealing engagement with the seat.

3. In a valve, a cylindrical seat, a sealing element of obdurate material comprising a hollow conical section having a circular peripheral edge adapted to be readily moved into said seat, a stop positioned in and adjustable longitudinally of the seat and against which the element is adapted to abut when moved into the seat, and means to move the sealing element against the stop and to compress said sealing element in the direction of its axis against said stop for the purpose of stressing the sealing element within its elastic limit and thereby expanding its periphery into sealing engagement with the seat.

4. In a valve, a cylindrical seat, a sealing element of obdurate material comprising a hollow conical section having a circular peripheral edge adapted to be readily moved into said seat, a stop positioned in and adjustable longitudinally of the seat and against which the element is adapted to abut when moved into the seat, means to move the sealing element against the stop and to compress said sealing element in the direction of its axis against said stop for the purpose of stressing the sealing element within its elastic limit and thereby expanding its periphery into sealing engagement with the seat, and means to adjust the position of the stop within the seat to vary the position of establishment of the sealing relation between the sealing element and its seat.

5. In a valve, a substantially cylindrical valve seat, a hollow substantially conical sealing element of obdurate material adapted to be moved into said seat and into substantially coaxial relation therewith, stop means also movable into said seat to arrest movement of the sealing element at a predetermined position, and means for forcing the sealing element in the direction of the stop means to decrease the altitude of the sealing element and for peripherally expanding said element into sealing engagement with the seat while stressing said sealing element within its elastic limits.

Signed by me at Jersey City, N. J., this 29th day of December, 1925.

WYLIE G. WILSON.